L. A. HAWKINS.
SIGNAL SYSTEM.
APPLICATION FILED NOV. 2, 1908.
923,170.
Patented June 1, 1909.
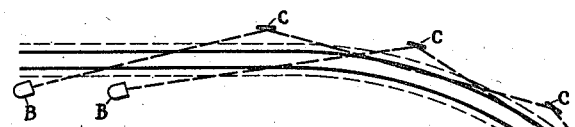
Fig. 1.
Fig. 2.
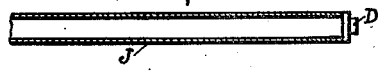
Fig. 3.
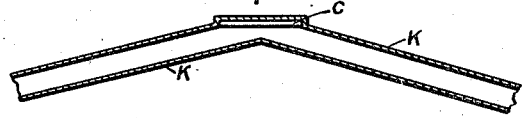
Fig. 4.
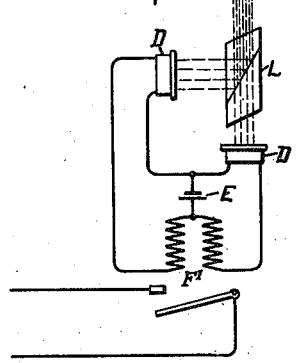
Fig. 5.
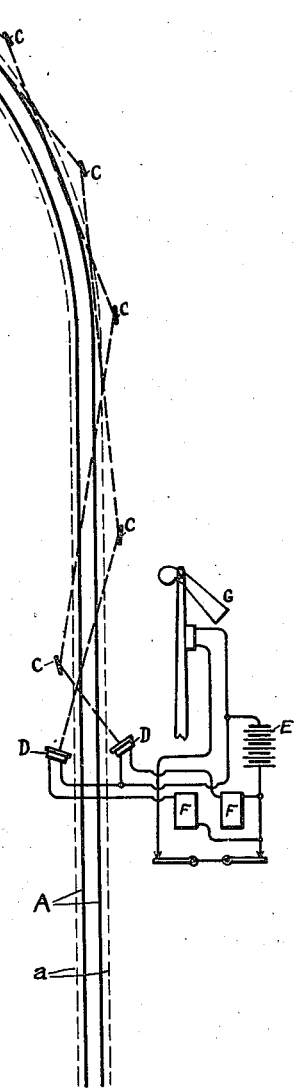
Witnesses:
Irving E. Steers.
J. Ellis Glen.
Inventor
Laurence A. Hawkins,
by Albert G. Davis
Att'y.

UNITED STATES PATENT OFFICE.

LAURENCE A. HAWKINS, OF SCHENECTADY, NEW YORK, ASSIGNOR TO GENERAL ELECTRIC COMPANY, A CORPORATION OF NEW YORK.

SIGNAL SYSTEM.

No. 923,170.  Specification of Letters Patent.  Patented June 1, 1909.

Application filed November 2, 1908. Serial No. 460,579.

*To all whom it may concern:*

Be it known that I, LAURENCE A. HAWKINS, a citizen of the United States, residing at Schenectady, in the county of Schenectady and State of New York, have invented certain new and useful Improvements in Signal Systems, of which the following is a specification.

My invention relates to signal systems for railways, and its object is to provide a novel type of system which, without the use of track circuits, gives all the protection obtained with the usual track circuit, except the indication of a broken rail.

My invention consists in providing means for directing a beam of light across a portion of track to be protected, and a receiver exposed to the light and responsive to variations therein for controlling a signal, so that a car on that portion of track operates the signal by cutting off the light from the receiver. Selenium cells, as is well known, vary in electrical resistance with variation of light on the cell, so that such cells are well adapted to be used as receivers in my system.

My system will best be understood by reference to the accompanying drawings, in which—

Figure 1 shows diagrammatically a signal system arranged in accordance with my invention; Fig. 2 shows a suitable arrangement of the source of light; Fig. 3 shows a suitable arrangement of the receiver; Fig. 4 shows an intermediate reflector; and Fig. 5 shows a modified arrangement of the receiver.

In Fig. 1, A represents the rails of a track, and the dotted lines *a* represent the clearance lines of a car on the track. B B represent sources of light, the rays from which are directed across portions of the track by suitable reflecting and focusing means. C C represent reflectors adapted to receive the beams of light and to reflect them again across other portions of track. D D represent receivers in the form of selenium cells exposed to the beams of light from the two sources. It will be noticed that the sources and reflectors are arranged to direct the beams of light in such manner that a car anywhere on the track between the sources and the cells D D will cut off the light from one or the other of the two cells. E represents a battery or other source of current in circuit with the cells D D, each of which has in series with it a relay F. The contacts of the two relays are in series in the controlling circuit of a signal G.

As long as both cells are exposed to the light beams, the resistance of both cells is low, so that the relays F F are energized and the signal G maintained clear. As soon as a car enters the portion of track guarded by the signal, it cuts off the light from one of the two cells, the resistance of which immediately rises, so as to cause the relay F in series with it to drop its contact, and thereby to open the signal circuit to put the signal at danger. Until the car has passed the sources B B, one cell or the other is deprived of light by the car, so that the signal remains at danger.

In order that the beam of light may be well directed, each source of light B, which in Fig. 2 is shown as an incandescent lamp, may be provided with a parabolic reflector H and a lens *h*. In order to prevent the cell D from being affected by the sources of light other than that to which it is intended to respond, it may be protected by a long tube or hood J, as shown in Fig. 3, while the reflectors C may be provided with similar tubes or hoods, as shown at K in Fig. 4. If these hoods are properly directed the cell can be affected only by light entering the path of the beam from the source of light to the cell, so that if the source of light, reflectors, and cell are placed at such a height as not to be exposed to a headlight or other strong light on a moving train the cell is protected from disturbance by light from sources other than its own.

In place of using the arrangement of hoods above described, an arrangement similar to that described in Patent No. 891,339, Hirt, June 23, 1908, may be employed,—that is, the light coming from the source may be polarized and a Nicols prism or other double refracting body L may be interposed between the incoming beam and the cell. In such a case two cells D D are employed for each beam of light and are placed in circuit with the battery E, and the two opposing windings of a differential relay $F^1$. The polarized light from the source falling on the prism L is refracted, so as to fall on one only of the cells D D, so that one coil only of differential relay $F^1$ is energized. In this case the relay will close its contact. Non-polarized light, such as would be received from foreign sources, falling on the prism is directed upon both cells D D, as shown in dotted lines in Fig. 5, so that both windings of relay F¹ are traversed by current, and therefore neutralize each other, so that the relay contact remains open, as shown in Fig. 5.

It will, of course, be understood that my invention may be utilized for controlling both home and distant signals or three-position signals, with or without overlaps, in the usual manner. The signal circuits may be connected precisely as in the usual track circuit systems, the cells and relays in series with them taking the place of the usual track relay and its track connections. Furthermore, a signal may control a series of track sections protected by different cells and their sources precisely as in the well known "cut section" arrangement in track circuit systems.

My invention is particularly advantageous for use in subways or tunnels where the system is not exposed to the weather, or on short lengths of track where the rails are supported on iron ties, as on bridges, where a track circuit cannot conveniently be operated. It is possible to operate long blocks exposed to the weather by the use of a powerful source of light and by employing the "cut-section" arrangement above referred to, precisely as it is employed in track circuit systems to operate a long block where the rail-to-rail resistance is low and track leakage high.

I do not desire to limit myself to the particular construction and arrangement of parts here shown, but aim in the appended claims to cover all modifications which are within the scope of my invention.

What I claim as new and desire to secure by Letters Patent of the United States, is,

1. In a signal system for railways, a stationary source of light, means for directing the light across a portion of track, a receiver exposed to said light and responsive to variations therein, and a signal controlled by said receiver, whereby a car on said portion of track operates said signal by cutting off the light from said receiver.

2. In a signal system for railways, a stationary source of light, means for directing the light across a portion of track, a selenium cell arranged to receive said light after it has crossed the track, and a source of current and signal-controlling means in circuit with said cell.

3. In a signal system for railways, a plurality of stationary sources of light, means for directing the light from said sources across different portions of track, a plurality of receivers for the light from the several sources responsive to variations in light, and a signal controlled by a plurality of said receivers.

4. In a signal system for railways, a plurality of stationary sources of light, means for directing the light from said sources across different portions of track, a plurality of selenium cells arranged to receive the light from the several sources, sources of current in circuit with the cells, signal-controlling means in the several cell circuits, and a signal controlled by a plurality of said signal-controlling means.

5. In a signal system for railways, a stationary source of light, means for directing the light across a portion of track, a receiver exposed to said light and responsive to variations therein, a signal controlled by said receiver, and means for preventing light from other sources from affecting said receiver to control said signal.

6. In a signal system for railways, a stationary source of light, means for directing the light across a portion of track, a selenium cell arranged to receive said light after it has crossed the track, a source of current in circuit with said cell, signal-controlling means in circuit with said cell, and means for preventing light from other sources from affecting said cell to actuate said signal-controlling means.

In witness whereof I have hereunto set my hand this 30th day of October, 1908.

LAURENCE A. HAWKINS.

Witnesses:
BENJAMIN B. HULL,
HELEN ORFORD.